United States Patent [19]

Mavrakis

[11] Patent Number: 4,892,241

[45] Date of Patent: Jan. 9, 1990

[54] TACKLE BOX

[76] Inventor: Gus H. Mavrakis, 135 Burlington Ave., Billings, Mont. 59101

[21] Appl. No.: 230,609

[22] Filed: Aug. 10, 1988

[51] Int. Cl.⁴ .................. A45F 3/04; B65D 25/10; A01K 97/06
[52] U.S. Cl. .................. 224/216; 224/245; 224/920; 43/57.1; 206/315.11
[58] Field of Search ............... 224/196, 199, 204, 208, 224/215, 216, 242, 245, 270, 272, 920; 43/54.1, 57.1; 206/315.11

[56] References Cited

U.S. PATENT DOCUMENTS

| | | | |
|---|---|---|---|
| 2,065,234 | 12/1936 | Martinez | 43/57.1 |
| 2,268,920 | 1/1942 | Baumgartner | 43/57.1 |
| 2,853,709 | 9/1958 | Peterson et al. | 43/54.1 X |
| 3,758,977 | 9/1973 | Miller | 43/57.1 |

FOREIGN PATENT DOCUMENTS 442588  2/1936  United Kingdom ............... 43/57.1

Primary Examiner—Ernest G. Cusick
Assistant Examiner—R. M. Fetsuga
Attorney, Agent, or Firm—Kimmel, Crowell & Weaver

[57] ABSTRACT

The tackle box of the invention comprises a support member having structure for securing it to a front portion of the waist of a user, a first receptacle pivotally mounted to the support member and adapted to move between a closed position disposed upwardly against the support member and an open position disposed generally horizontally in front of the support member, and a supplemental cover and shelf member pivotally mounted to the receptacle for movement between a closed position disposed in overlying relationship to the receptacle and an open position disposed generally horizontally in front of the receptacle. A second receptacle is mounted to a front wall of the first receptacle and the contents thereof are accessible without opening the first receptacle, whereby items likely to be chosen more often may be stored in the second receptacle. A plurality of removable rods are frictionally retained to the shelf member for holding flies, hooks and other articles. In one form of the invention, at least one envelope-like pouch is secured to the front of the tackle box.

5 Claims, 2 Drawing Sheets

TACKLE BOX

FIELD OF THE INVENTION

This invention relates to sporting equipment, and more particularly, to an improved tackle box that is adapted to be worn and supported by the user.

DESCRIPTION OF THE PRIOR ART

Tackle boxes are used by fishermen as containers for articles such as lures, weights, plugs, swivels, bobbers, bait and the like. Many prior art tackle boxes are relatively large and are intended to be sat down on the bank of a body of water, or supported in the bottom of a boat, etc. This type of tackle box, while suitable for the intended purpose, must be left on the bank of a body of water, or left in the bottom of a boat, etc., until ready for use. It is also provided with a handle for carrying the tackle box from one place to another. An example of one such prior art tackle box is shown in U.S. Pat. No. 4,729,474.

Other prior art tackle boxes have means for supporting them on the person of the user, such as by belts, straps, and the like. This type of prior art tackle box is much more convenient to use, since it is always available on the user and need not be carried by a separate handle. Examples of this type of prior art tackle box are shown in U.S. Pat. Nos. 1,827,929, 2,538,576, 2,677,486, 3,148,811, 3,151,790, 3,277,599, 3,638,843 and 3,672,548. These tackle boxes vary from fishing creels or baskets with a hinged top lid as shown in U.S. Pat. No. 2,538,576 to a multi-compartment box having a plurality of interengaged sections openable to define a generally horizontal tray as shown in U.S. Pat. No. 3,672,548.

SUMMARY OF THE INVENTION

The present invention represents an improvement over the above-noted prior art. In accordance with the present invention, a unique and improved tackle box is provided with means facilitating the storage of and access to various fishing tackle, including live bait, and also has a unique means for attaching and holding flies or like articles.

A general object of the invention is thus to provide a new and improved tackle box that is supported on the front of the user and which may be readily opened and closed while in the worn position for access to the contents.

Another object of the invention is to provide a tackle box which is adapted to be worn on the front of the user, and which includes multiple compartments that may be accessed independently of one another while being worn.

A further object of the invention is to provide a tackle box which has removable means for securely engaging and holding in place flies and other hooked articles.

BRIEF DESCRIPTION OF THE DRAWINGS

The foregoing and other objects and advantages of the invention will become apparent from the following detailed description and accompanying drawings, in which like reference characters designate like parts throughout the several views, and wherein.

DETAILED DESCRIPTION OF THE PREFERRED EMBODIMENTS

Figure 1:
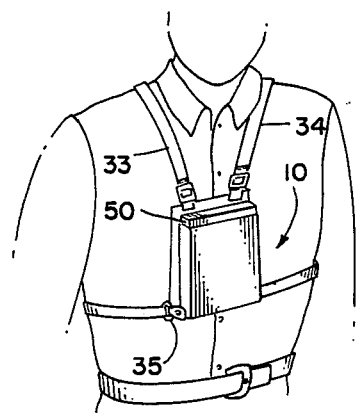
FIG. 1 is a fragmentary front perspective view showing the tackle box of the invention being worn on the front of the user.

Referring more particularly to the drawings, a first form of tackle box according to the invention is shown generally at 10. The tackle box comprises a boxlike container or receptacle 11 having side walls 12, a bottom wall 13 and front and rear walls 14 and 15, respectively. The side walls include forwardly projecting portions 16 adjacent the front, upper edge thereof and which extend beyond the plane of the front wall 14. The front wall includes a mating, offset portion 17.

The interior of the receptacle 11 is divided into a plurality of compartments by removable partitions 18, whereby articles or objects of different variety, such as lures, weights, etc., may be stored in different compartments. By removing the partitions, the interior of the receptacle may be made larger for storing larger items.

Figure 2:
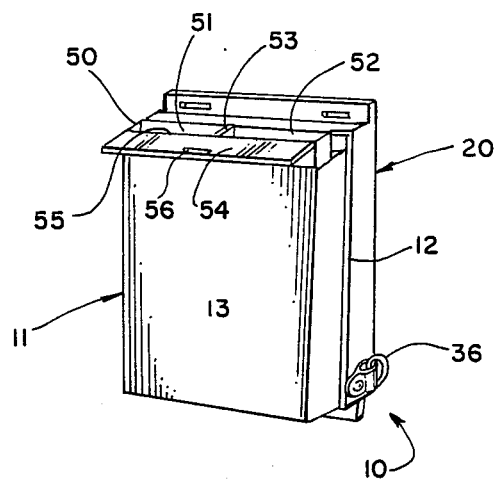
FIG. 2 is a top perspective view of the tackle box of the invention with one compartment shown in an opened position.
Figure 7:
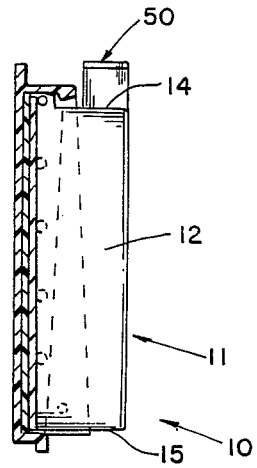
FIG. 7 is a partially sectional view of the tackle box shown in its fully closed position.

A support member 20, which serves as an outer cover, is pivotally mounted to the receptacle by pivot pins 21 and includes a back wall 22, side walls 23, and front and rear walls 24 and 25, respectively. The front wall has a projection or detent 26 on a lower inside edge thereof for cooperation with a complemental detent 27 on the forwardly offset front wall portion 17 of the receptacle 11 to hold the receptacle and cover or support in closed position as shown in FIGS. 1, 2 and 7.

Figure 3:
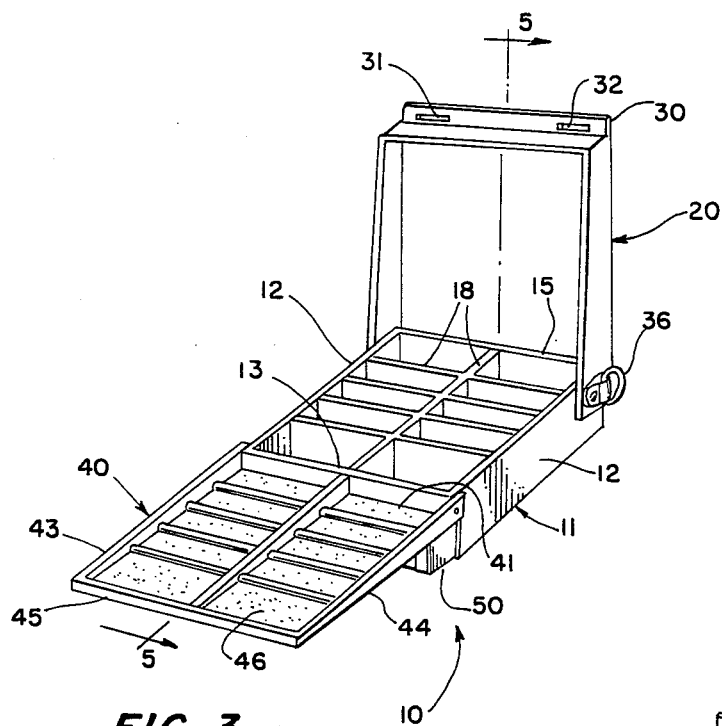
FIG. 3 is a top perspective view of the tackle box of the invention, with another compartment shown in an opened position.

The rear wall 25 of the support or cover 20 terminates at a stop flange 28 which serves to limit the movement of the receptacle beyond a generally horizontal position as shown in FIG. 3, for example, when the receptacle is in its opened position.

The support 20 includes an upwardly extending flange 30 which projects beyond the front wall 24 and which has a pair of slots or openings 31 and 32 therein for attachment of one end of support straps 33 and 34. The straps are intended to extend over the shoulders of the user and are connected at their other ends with loop rings 35 and 36 attached to the receptacle by the pivot pins 21. The length of the straps is adjustable in a conventional manner to accommodate the tackle box harness to users of different size.

Figure 5:
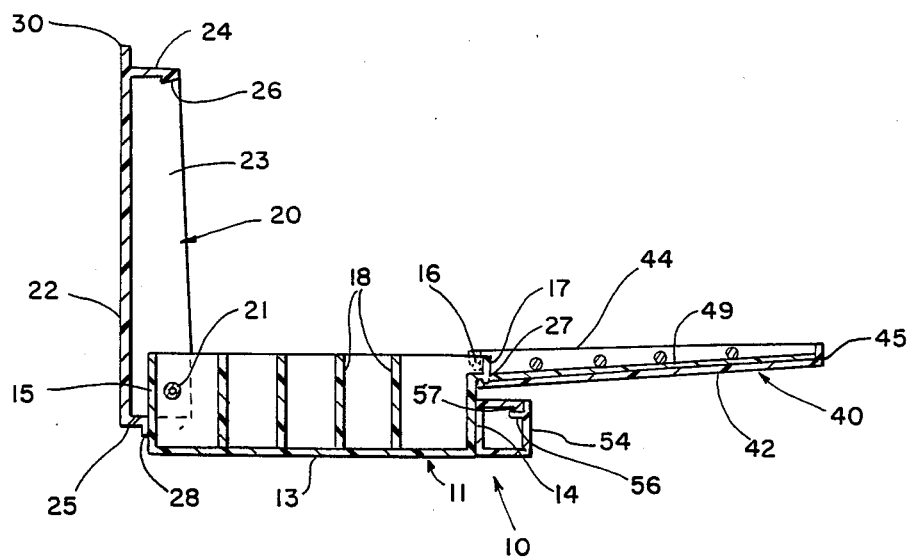
FIG. 5 is a vertical sectional view taken along line 5-5 in FIG. 3.
Figure 6:
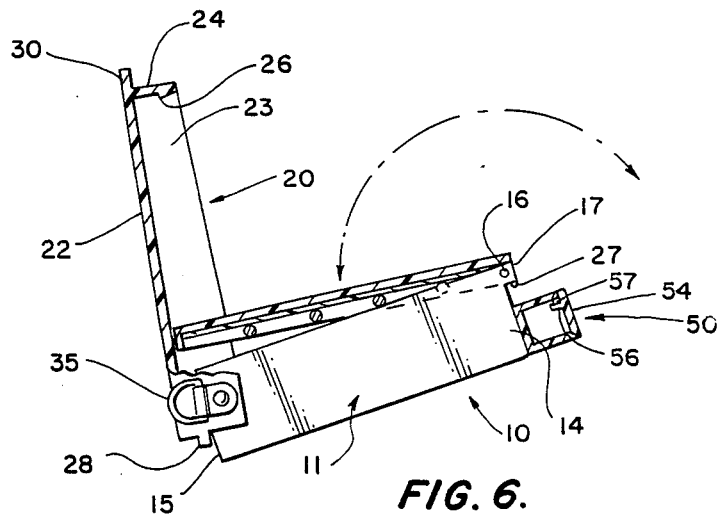
FIG. 6 is a partially sectional view of the tackle box shown partially closed.

A combined shelf and supplemental cover 40 is pivotally mounted at one edge 41 thereof to the forwardly projecting side wall portions 16 of the receptacle. The supplemental cover 40 includes a shelf wall 42, side walls or flanges 43 and 44 and an end wall 45. The side walls and end wall, together with the complemental front wall portion 17 on the receptacle, serve to retain articles placed on the shelf. Further, as seen best in FIG. 5, the shelf slopes downwardly toward the receptacle, whereby articles will tend to move toward the receptacle rather than over the end wall of the shelf. The supplemental cover and shelf 40 not only serves to prevent inadvertent disengagement of articles from the several compartments in the receptacle but also provides a platform upon which various articles, e.g., lures, flies, weights, etc., may be deposited for selection by the fisherman.

Figure 4:
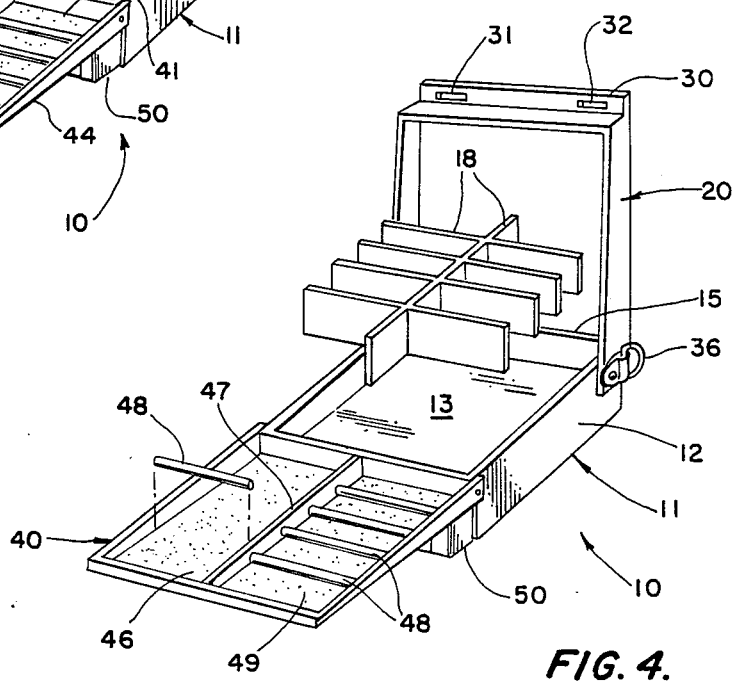
FIG. 4 is an exploded top perspective view of the tackle box of the invention, showing the removable partitions.

As seen best in FIGS. 2, 3 and 4, the upwardly facing interior shelf space 46 is longitudinally divided by a partition 47, and a plurality of removable rods 48 are frictionally engaged at their opposite ends between the partition 47 and an adjacent side wall 43 or 44. A thin layer of cork 49 or like material, e.g., foamed polystyrene, is suitably secured, as with an adhesive or the like, to the upwardly facing surface of the shelf beneath the rods. With this structure, flies and other articles may be secured beneath the rods against the layer of cork or the like. To remove a fly, the appropriate rod may be at least partially lifted away from the layer of cork or the like to free the fly without tearing the cork or the like. Alternatively, the fly may simply be pulled from beneath the rod and out of the cork or like material. The former procedure avoids tearing of the cork, while the latter avoids the necessity of first lifting the rod. One or more rods may also be removed and left out of the shelf space to provide an area for sorting various articles.

The forwardly projecting or offset front wall portion 17 also serves as a stop to engage the rear edge of the supplemental cover and shelf unit and prevent its displacement beyond an approximately horizontal position as shown in FIG. 3, for example.

A separate compartment 50 is secured on top of the front wall 24 of the support unit 20, and may be divided into two or more compartments 51 and 52 by a one or more partition walls 53. A single cover 54 for closing the compartment 50 may be hinged along a front edge 55 thereof, or a separate cover (not shown) for each such compartment may be provided. The cover or covers 54 are held in their closed position by suitable detents 56 and 57 on the cover and compartment wall, respectively. The compartment 50 may be used for storing various articles, such as live bait, weights, flies, etc., which are likely to be chosen frequently during use, thereby avoiding the necessity of opening the main compartment or receptacle.

Figure 8:
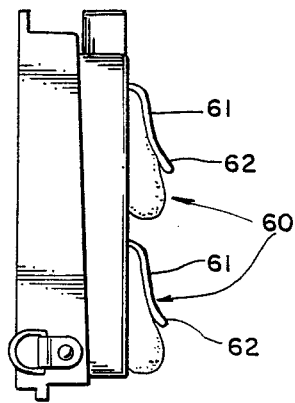
FIG. 8 is a side view in elevation of a modified tackle box with additional pouches on the front thereof.
Figure 9:
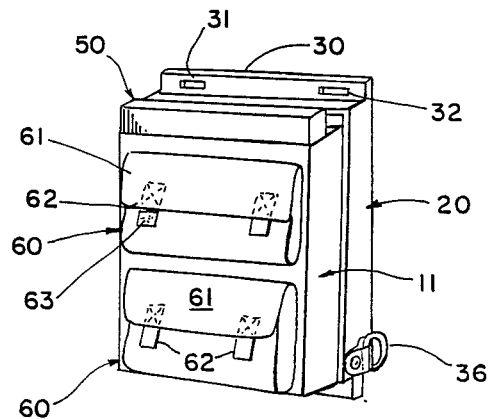
FIG. 9 is a front perspective view of the modification shown in FIG. 8.

As shown in FIGS. 8 and 9, one or more pouches 60 may be secured to the outside of the box (bottom of wall 13 on receptacle 11) for containing various articles. The pouches are closed by flaps 61, secured with straps 62 and suitable fasteners, such as patches 63 of Velcro.

The particular materials employed to make the tackle box of the invention are not critical and may be selected from any well known material suitable for the purpose, such as metal, plastic and the like. Preferably, the box is made from high impact polystyrene. This material may be easily and inexpensively molded to form the desired product in a manner known in the art.

It should also be noted that the unique arrangement of receptacle, cover or support and supplemental cover serve to prevent moisture, i.e., rain or the like, from entering the receptacle.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A tackle box, comprising:

a cover and support member having a front wall, opposite side walls and a back wall;

means on the support member for securing the support member on the body of a user near the front of the user's waist;

a first receptacle having front, back, side and bottom walls and pivotally mounted at the back wall to a bottom edge of the support member for movement between an upwardly pivoted closed position disposed against the support member and an open position pivoted downwardly to a generally horizontal orientation in front of the support member;

a supplemental cover and shelf member having a first wall, opposite side walls and a back wall defining a shallow tray and wherein at least said opposite side walls have flat inner surfaces, said member pivotally mounted at a back edge thereof to the front wall of the receptacle and movable between a first position disposed in closed, overlying relationship to the receptacle and a second position disposed in open, generally horizontal position extending outwardly from the front wall of the receptacle;

a second receptacle secured on the front wall of the first receptacle in a position to be accessible to the user when the first receptacle is in its closed position relative to the cover and support member; and a plurality of removable elongate rods frictionally held in the tray in spaced relationship to one another for releasably holding flies, hooks and other articles in the tray, said rods having opposite flat ends wedged between the flat inner surfaces of the opposite side walls of said tray thereby being held in position solely by tight frictional engagement between said ends of the rods and said opposite sides of the tray.

2. A tackle box as claimed in claim 1, wherein:

said tray is divided into a plurality of compartments by at least one partition wall extending across said tray; and said removable rods are frictionally engaged at their opposite ends against said partition wall and one of said side walls.

3. A tackle box as claimed in claim 2, wherein:

a thin layer of cork or like material is secured in said tray against said shelf wall beneath said rods.

4. A tackle box as claimed in claim 3, wherein:

at least one envelope-like pouch is secured to the outside surface of the bottom wall of the first receptacle, said pouch being closed by a flap and fasteners.

5. A tackle box as claimed in claim 1, wherein:

said second receptacle is divided into a plurality of compartments; and said compartments are closed by at least one pivoted closure.

* * * * *